United States Patent
Overstreet et al.

(10) Patent No.: US 9,303,305 B2
(45) Date of Patent: Apr. 5, 2016

(54) NON-MAGNETIC DRILL STRING MEMBER WITH NON-MAGNETIC HARDFACING AND METHOD OF MAKING THE SAME

(75) Inventors: James L. Overstreet, Tomball, TX (US); Jimmy W. Eason, The Woodlands, TX (US); Travis Puzz, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 803 days.

(21) Appl. No.: 13/360,363

(22) Filed: Jan. 27, 2012

(65) Prior Publication Data
US 2012/0193148 A1      Aug. 2, 2012

Related U.S. Application Data

(60) Provisional application No. 61/437,133, filed on Jan. 28, 2011.

(51) Int. Cl.
*B23K 31/02*      (2006.01)
*C23C 4/06*      (2006.01)
*C23C 4/12*      (2006.01)
*C23C 30/00*      (2006.01)
(Continued)

(52) U.S. Cl.
CPC . *C23C 4/06* (2013.01); *B23K 9/048* (2013.01); *B23K 31/025* (2013.01); *C23C 4/124* (2013.01); *C23C 4/127* (2013.01); *C23C 30/00* (2013.01); *E21B 17/1085* (2013.01); *Y10T 428/25* (2015.01); *Y10T 428/31678* (2015.04)

(58) Field of Classification Search
None
See application file for complete search history.

(56) References Cited

U.S. PATENT DOCUMENTS

| | | | |
|---|---|---|---|
| 3,800,891 A | | 4/1974 | White et al. |
| 4,173,457 A | * | 11/1979 | Smith ............................ 51/309 |
| 4,228,339 A | * | 10/1980 | Scales et al. .................... 219/77 |

(Continued)

FOREIGN PATENT DOCUMENTS

EP      1857204 A1 *   11/2007

OTHER PUBLICATIONS

International Searcg Report and Written Opinion of the International Searching Authority, or the Declaration mailed on Jul. 12, 2012 for International Patent Application No. PCT/US2012/022990 filed on Jan. 27, 2012.

(Continued)

*Primary Examiner* — Kiley Stoner
(74) *Attorney, Agent, or Firm* — Cantor Colburn LLP

(57) ABSTRACT

A method for applying a non-magnetic, abrasive, wear-resistant hardfacing material to a surface of a drill string member includes providing a non-magnetic drill string member formed of a non-magnetic material, the drill string member having an outer surface. It also includes providing a non-magnetic hardfacing precursor material comprising a plurality of non-magnetic, sintered carbide pellets and a non-magnetic matrix material; heating a portion of the non-magnetic hardfacing precursor material to a temperature above the melting point of the matrix material to melt the matrix material. It further includes applying the molten non-magnetic matrix material and the plurality of non-magnetic, sintered carbide pellets to the exterior surface of the drill string member; and solidifying the molten non-magnetic matrix material to form a layer of a non-magnetic hardfacing material having a plurality of non-magnetic, sintered carbide pellets dispersed in the hardfacing material.

30 Claims, 10 Drawing Sheets

(51) Int. Cl.
  *E21B 17/10* (2006.01)
  *B23K 9/04* (2006.01)

(56) References Cited

U.S. PATENT DOCUMENTS

| | | | |
|---|---|---|---|
| 4,243,727 A * | 1/1981 | Wisler et al. | 428/558 |
| 5,048,619 A * | 9/1991 | Leaney et al. | 175/40 |
| 5,368,109 A * | 11/1994 | Pittard et al. | 175/45 |
| 5,482,670 A | 1/1996 | Hong | |
| 5,532,049 A * | 7/1996 | Masuda et al. | 428/216 |
| 5,663,512 A | 9/1997 | Schader et al. | |
| 5,894,896 A * | 4/1999 | Smith et al. | 175/73 |
| RE37,127 E | 4/2001 | Schader et al. | |
| 7,083,006 B2 * | 8/2006 | Kruspe et al. | 175/40 |
| 7,597,159 B2 | 10/2009 | Overstreet | |
| 7,666,244 B2 * | 2/2010 | Lockwood et al. | 75/240 |
| 7,703,555 B2 | 4/2010 | Overstreet | |
| 7,997,359 B2 | 8/2011 | Eason et al. | |
| 8,002,052 B2 | 8/2011 | Stevens et al. | |
| 8,004,421 B2 | 8/2011 | Clark | |
| 8,388,723 B2 | 3/2013 | Overstreet | |
| 8,540,036 B2 | 9/2013 | Overstreet | |
| 8,607,900 B1 * | 12/2013 | Smith | 175/394 |
| 8,758,462 B2 | 6/2014 | Overstreet | |
| 2002/0037200 A1 | 3/2002 | Boyce | |
| 2002/0185314 A1 * | 12/2002 | Cargill et al. | 175/57 |
| 2002/0185315 A1 * | 12/2002 | McLoughlin et al. | 175/76 |
| 2004/0149492 A1 * | 8/2004 | Taylor et al. | 175/57 |
| 2005/0217898 A1 * | 10/2005 | Clark | 175/56 |
| 2006/0127269 A1 * | 6/2006 | Caron | 420/431 |
| 2006/0207803 A1 * | 9/2006 | Overstreet | 175/374 |
| 2007/0051538 A1 * | 3/2007 | Angman et al. | 175/57 |
| 2007/0056776 A1 | 3/2007 | Overstreet | |
| 2007/0056777 A1 | 3/2007 | Overstreet | |
| 2008/0029310 A1 * | 2/2008 | Stevens et al. | 175/374 |
| 2008/0073125 A1 | 3/2008 | Eason et al. | |
| 2008/0083568 A1 | 4/2008 | Overstreet et al. | |
| 2008/0093124 A1 * | 4/2008 | Giroux et al. | 175/45 |
| 2008/0141826 A1 * | 6/2008 | Marya et al. | 75/331 |
| 2009/0065260 A1 * | 3/2009 | Overstreet | 175/347 |
| 2009/0113811 A1 | 5/2009 | Overstreet | |
| 2009/0285712 A1 * | 11/2009 | Gries et al. | 419/30 |
| 2010/0009089 A1 * | 1/2010 | Junod et al. | 427/446 |
| 2010/0101866 A1 | 4/2010 | Bird | |
| 2010/0132265 A1 | 6/2010 | Overstreet | |
| 2010/0175888 A1 * | 7/2010 | Buytaert et al. | 166/373 |
| 2012/0192760 A1 * | 8/2012 | Overstreet et al. | 106/286.3 |

OTHER PUBLICATIONS

International Search Report and Written Opinion of the International Searching Authority, or the Declaration mailed on Jul. 12, 2012 for International Patent Application No. PCT/US2012/022995 filed on Jan. 27, 2012.

Specification for Rotary Drill Stem Elements, Fortieth Addition, Mar. 1, 2002, p. 26, American Petroleum Institute (API) Publications, Washington, D.C.

Rankin Hardfacing Products, compositional data for VERSAlloy Nickel Hardfacing Alloys, Accessed Online Nov. 20, 2014, http://www.broco-rankin.com/linkservid/F364048F-3048-651A-FE228D1DF2402744/showMeta/0/.

* cited by examiner

NON-MAGNETIC DRILL STRING MEMBER WITH NON-MAGNETIC HARDFACING AND METHOD OF MAKING THE SAME

CROSS REFERENCE TO RELATED APPLICATIONS

This application claims the benefit of an earlier filing date from U.S. Provisional Application Ser. No. 61/437,133 filed Jan. 28, 2011, the entire disclosure of which is incorporated herein by reference.

BACKGROUND

Downhole operations, including well production or completion, particularly for oil and natural gas wells, utilize various drill string members that must maintain high wear resistance and fracture toughness while also meeting other design requirements.

It is a long-standing practice in the design and manufacture of such downhole tools and components to apply wear-resistant hardfacing materials to surfaces that are subject to abrasive wear during downhole operations. In the past, these hardfacing compositions generally comprised various carbides of the elements of Groups IVB, VB, and VIB in a matrix metal of iron, cobalt, or nickel and alloys and mixtures thereof. Hardfacing materials have generally been applied by melting the matrix of the hardfacing material and a portion of the surface to which the hardfacing is applied using various methods. The various carbide particles give the hardfacing material hardness and wear resistance, while the matrix metal lends the hardfacing material fracture toughness. A hardfacing material must generally strike an adequate balance between wear resistance, which is generally associated with its hardness, and fracture toughness.

Many factors affect the suitability of a hardfacing composition for a particular application. These factors have generally included the chemical composition and physical structure of the carbides employed in the composition, the chemical composition and microstructure of the matrix metal or alloy, and the relative proportions of the carbide materials to one another and to the matrix metal or alloy. However, as the complexity of downhole operations and associated instrumentation increases, other factors also have bearing on the suitability of a hardfacing composition for a particular application. One such factor is the magnetic properties, such as the magnetic permeability, of the hardfacing material. Hardfacing materials have generally not been designed to control the magnetic permeability, and generally have had high magnetic permeability. However, the increased complexity and sensitivity of downhole instrumentation to extraneous magnetic fields, or to alteration of the magnetic fields produced by the instrumentation, associated with the hardfacing materials used to protection them makes it very desirable to identify hardfacing materials that have controlled magnetic properties, particularly reduced magnetic permeability, so as to avoid interference with magnetic measurements in the region of the instrumentation.

Therefore, it is desirable to provide downhole tools and components that provide high wear resistance and fracture toughness, as well as a reduced magnetic permeability.

SUMMARY

In an exemplary embodiment, a method for applying a non-magnetic, abrasive, wear-resistant hardfacing material to a surface of a drill string member is disclosed. The method includes providing a non-magnetic drill string member formed of a non-magnetic material, the drill string member having an outer surface. The method also includes providing a non-magnetic hardfacing precursor material comprising a plurality of non-magnetic, sintered carbides and a non-magnetic matrix material and heating a portion of the non-magnetic hardfacing precursor material to a temperature above the melting point of the matrix material to melt the matrix material. The method further includes applying the molten non-magnetic matrix material and the plurality of non-magnetic, sintered carbides to the exterior surface of the drill string member; and solidifying the molten non-magnetic matrix material to form a layer of a non-magnetic hardfacing material having a plurality of non-magnetic, sintered carbides dispersed in the hardfacing material.

In another exemplary embodiment, a drill string member is disclosed. The member includes a drill string member having an outer surface and a non-magnetic, abrasive, wear-resistant hardfacing material disposed on the outer surface and configured for contact with an earth formation, the non-magnetic hardfacing material comprising a plurality of non-magnetic, sintered carbides dispersed in a non-magnetic matrix material.

BRIEF DESCRIPTION OF THE DRAWINGS

Referring now to the drawings wherein like elements are numbered alike in the several Figures.

DETAILED DESCRIPTION

Figure 1:
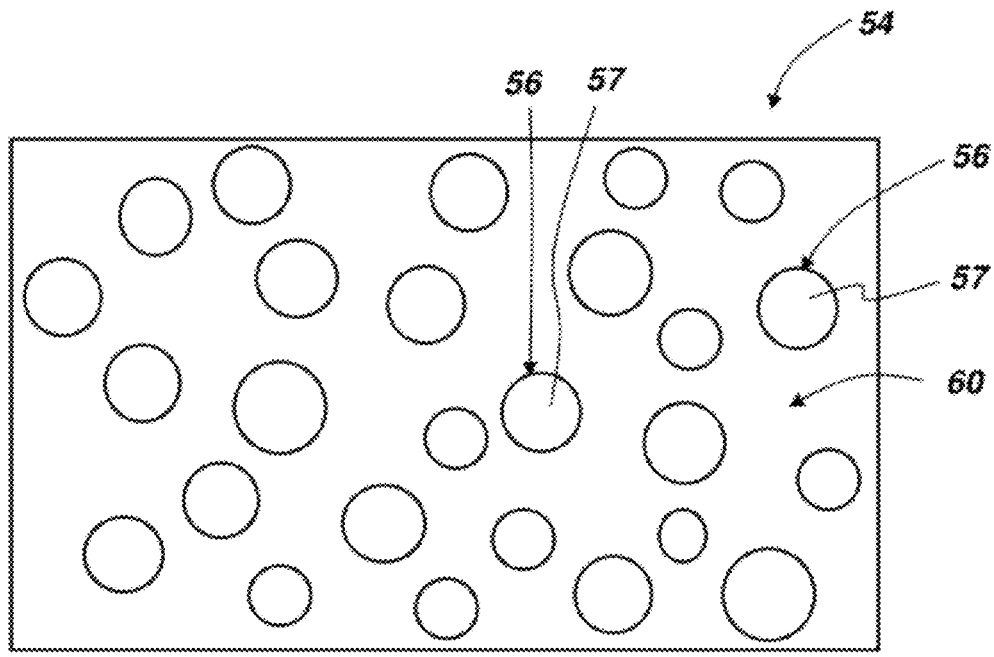
FIG. 1 is a schematic cross-sectional illustration of an exemplary embodiment of a non-magnetic, abrasive, wear-resistant material comprising non-magnetic, sintered carbide pellets substantially homogeneously dispersed in a matrix alloy as disclosed herein.

A detailed description of one or more embodiments of the disclosed material, apparatus and method are presented herein by way of exemplification and not limitation with reference to FIGS. 1-11.

A non-magnetic, abrasive, wear-resistant hardfacing material 54 is particularly suitable for application to various drill string members 201, particularly those comprising the bottom-hole-assembly 200 (BHA), and more particularly those comprising various measurement-while drilling (MWD) devices 202 or logging-while-drilling (LWD) devices 204, or portions of the drill string associated with these devices, including various drill collars, stabilizer sleeves, housings and other portions of the drill string that are located axially or radially proximate (or both) to these devices. The non-magnetic, abrasive, wear-resistant hardfacing material may be applied to any suitable portion of these devices, particularly an outer surface of these devices, and more particularly, an outer surface that has either constant or intermittent contact with an earth formation. The non-magnetic hardfacing material is suitable for application to drill string members 201 that require non-magnetic or at least reduced or controlled magnetic characteristics. For example, the non-magnetic hardfacing material may be used with these drill string members 201 to provide compatibility with instrumentation and sensors utilized in the BHA 200 that must be housed in non-magnetic materials as a design requirement, or to optimize their performance.

As used herein, in one embodiment, a non-magnetic hardfacing material 54 may be defined as a hardfacing material having a magnetic permeability that is compatible for use with the instrumentation and sensors utilized in the BHA, including MWD and LWD devices. In another exemplary embodiment, a non-magnetic hardfacing material 54 may be defined as a material that meets an American Petroleum Institute (API) or other materials standard organization specification for non-magnetic characteristics of rotary drill stem elements, such as API Spec 7-1. In yet another exemplary embodiment, a non-magnetic hardfacing material 54 may be defined as a hardfacing material that has a relative magnetic permeability that is less than or equal to 1.010, and may have a maximum deviation from a uniform magnetic field that does not exceed +/−0.05 microtesla.

The non-magnetic hardfacing material 54 includes a plurality of non-magnetic, sintered carbides 56 dispersed in a non-magnetic matrix, such as a non-magnetic metal matrix alloy 60, as described herein. The hardfacing material 54 may also include a plurality of cast carbides 58 dispersed in the non-magnetic matrix in combination with the non-magnetic, sintered carbides 56. The non-magnetic hardfacing material 54 may be used to make various non-magnetic drill string members 201, or may be used to provide non-magnetic hardfacing on surfaces or portions of such members, as described herein.

Referring generally to FIG. 1, the non-magnetic, abrasive, wear-resistant material 54, or non-magnetic hardfacing material, includes a plurality of non-magnetic sintered carbides 56 dispersed within a non-magnetic matrix alloy 60. Any suitable non-magnetic, sintered carbides 56 may be used, including various non-magnetic, sintered metal carbides 56. Suitable non-magnetic sintered metal carbides 56 may include various carbides, including boron carbide and carbides of the elements of Groups IVB, VB, and VIB, including chromium carbide, molybdenum carbide, niobium carbide, tantalum carbide, titanium carbide, tungsten carbide or vanadium carbide, or a combination thereof, and including alloys and mixtures thereof, as described herein. Any suitable non-magnetic matrix alloy 60 may be used, including various non-magnetic, metal matrix alloys 60. Suitable non-magnetic metal matrix alloys 60 include non-magnetic Ni alloys as described herein.

Figure 3:
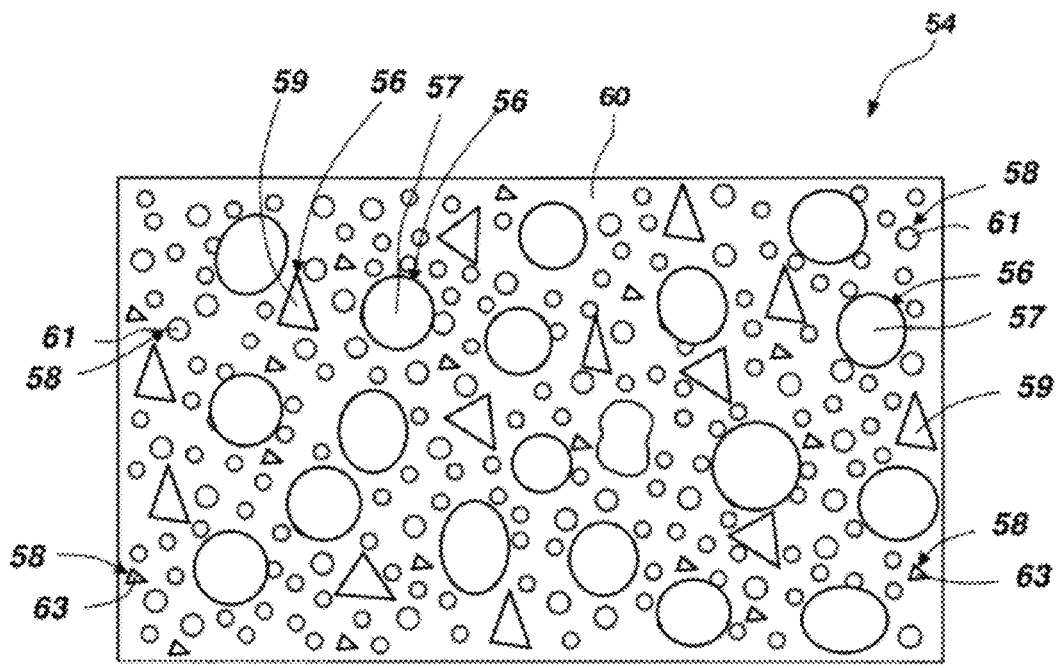
FIG. 3 is a schematic cross-sectional illustration of an exemplary embodiment of a non-magnetic, abrasive, wear-resistant material comprising non-magnetic, substantially spherical sintered carbide pellets, non-magnetic, substantially spherical cast carbide pellets, non-magnetic, crushed sintered carbide particles and non-magnetic, crushed cast carbide particles substantially homogeneously dispersed in a matrix alloy as disclosed herein.

In one exemplary embodiment, non-magnetic, sintered metal carbides 56 are dispersed substantially homogeneously within a non-magnetic matrix alloy 60 as illustrated in FIG. 1; however, other types of dispersions are possible, including dispersions that are not substantially homogeneous. The non-magnetic, sintered carbides 56 may have any suitable shape, and in one exemplary embodiment may have a substantially spherical shape and comprise substantially spherical non-magnetic, sintered carbide pellets 57. Substantially spherical, non-magnetic, sintered carbide pellets 57 may also encompass smoothed irregular shapes such that they are not true spheres, but are substantially missing the defined corners, sharp edges, angular projections, asperities and other features commonly found in crushed and other non-spherical carbide particles. In another exemplary embodiment, non-magnetic, sintered carbides 56 may have a crushed shape (or an as-crushed shape as described herein) which may include defined corners, sharp edges, angular projections, asperities and other features commonly found in particles formed by crushing a precursor material (e.g. sintered pellets), as described herein, and may comprise crushed, non-magnetic, sintered carbide particles 59 or granules as shown in FIG. 3. In yet another exemplary embodiment, non-magnetic, sintered carbides 56 may include a mixture of substantially spherical, non-magnetic, sintered carbide pellets 57 and crushed, non-magnetic, sintered carbide particles 59.

Figure 2:
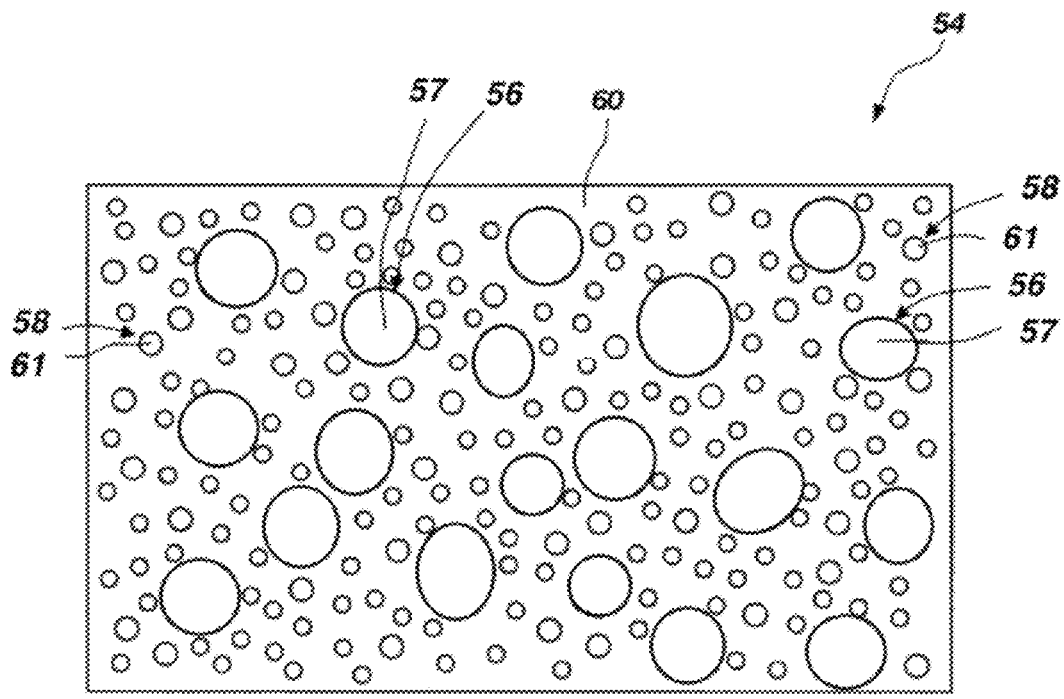
FIG. 2 is a schematic cross-sectional illustration of an exemplary embodiment of a non-magnetic, abrasive, wear-resistant material comprising non-magnetic, sintered carbide particles and non-magnetic, cast carbide particles substantially homogeneously dispersed in a matrix alloy as disclosed herein.
Figure 6:
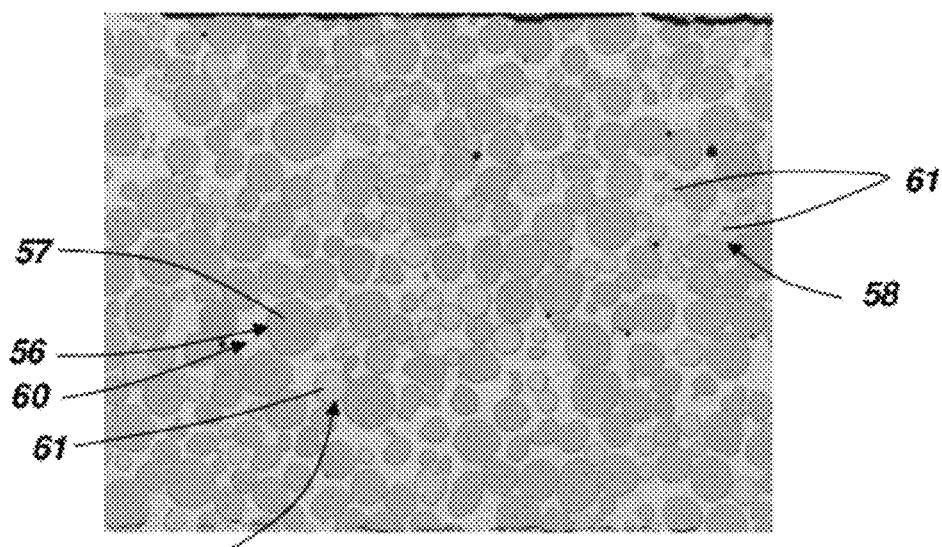
FIG. 6 is an optical photomicrograph of a microstructure of an exemplary embodiment of a non-magnetic, abrasive, wear-resistant material comprising non-magnetic, sintered carbide pellets and cast carbide particles substantially homogeneously dispersed in a matrix alloy as disclosed herein.

Referring generally to FIGS. 2 and 3, the non-magnetic, abrasive, wear-resistant material 54, or non-magnetic hardfacing material, may also include a plurality of non-magnetic, cast carbides 58 interspersed with the plurality of non-magnetic, sintered carbides 56 and dispersed within the non-magnetic matrix alloy 60 as shown in FIG. 2 to further improve the wear resistance and fracture toughness of non-magnetic, abrasive, wear-resistant material 54. Any suitable non-magnetic, cast carbides 58 may be used, including various non-magnetic, cast metal carbides 58. Suitable non-magnetic, cast metal carbide particles may include various carbides, including boron carbide and carbides of the elements of Groups IVB, VB, and VIB, including chromium carbide, molybdenum carbide, niobium carbide, tantalum carbide, titanium carbide, tungsten carbide, silicon carbide or vanadium carbide, or a combination thereof, and including alloys and mixtures thereof. An example of a suitable non-magnetic, cast metal carbide is a tungsten carbide comprising a eutectic of WC and $W_2C$. In one exemplary embodiment, non-magnetic, substantially spherical cast metal carbides 61 are dispersed substantially homogeneously within the non-magnetic matrix alloy 60 as illustrated in FIG. 2. The non-magnetic, cast carbides 58 may have any suitable particle shape, and in one exemplary embodiment may have a substantially spherical shape and comprise substantially spherical, non-magnetic cast carbide pellets 61. In another exemplary embodiment, non-magnetic, cast carbide pellets 61 may have smoothed or rounded irregular shapes, including that of various smoothed irregular polyhedrons, such that they are not true spheres, but are substantially missing the defined corners, sharp edges, angular projections, asperities and other features commonly found in crushed and other non-spherical carbide particles. This smoothing is similar to providing a radius on the particle edges and any pointed projections. These surface asperities or irregularities may cause the particles to possess residual stresses and surface energy and, for example, may promote melting or diffusion into the matrix during application of the hardfacing material, thereby degrading its properties. In one embodiment, the smoothed irregular shape comprises a smoothed truncated triangular prism platelet. In yet another exemplary embodiment, non-magnetic, cast carbides 58 may have a crushed shape (or an as-crushed shape as described herein) which may include defined corners, sharp edges, angular projections, asperities and other features commonly found in particles formed by crushing a precursor material (e.g., pellets), as described herein, and may comprise crushed, non-magnetic, cast carbide particles 63 or granules as shown in FIG. 3. FIG. 6 is an optical photomicrograph showing the microstructure of a non-magnetic, abrasive, wear-resistant material 54 that includes a plurality of non-magnetic, cast carbides 58 interspersed substantially homogeneously with a plurality of non-magnetic, sintered carbides 56 in a non-magnetic matrix alloy 60.

Figure 4:
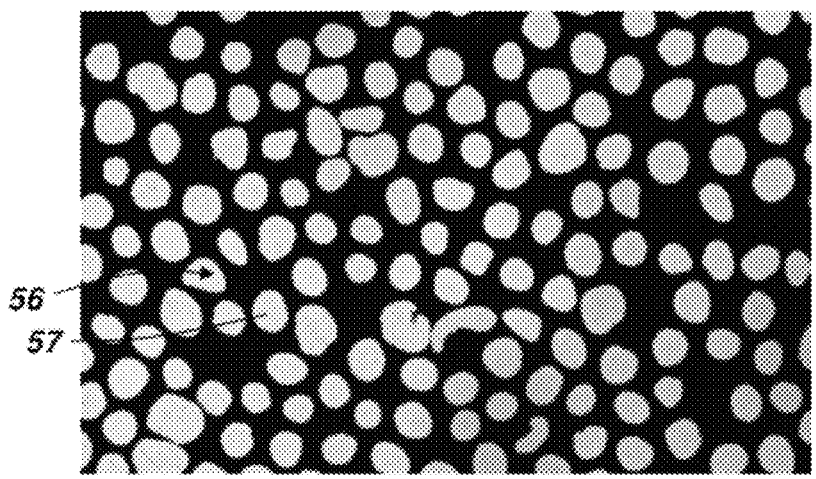
FIG. 4 is an optical photomicrograph of an exemplary embodiment of non-magnetic, substantially spherical sintered carbide pellets as disclosed herein.
Figure 5:
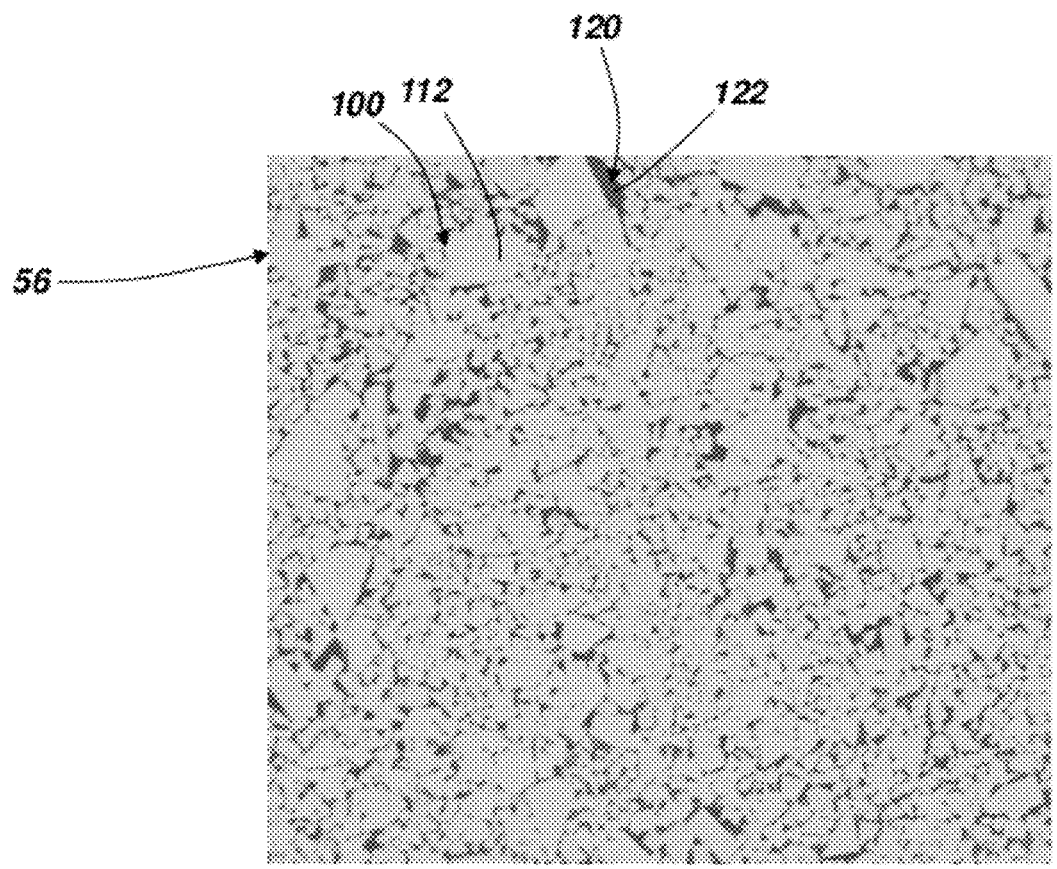
FIG. 5 is a scanning electron photomicrograph of the microstructure of a non-magnetic, substantially spherical sintered carbide pellet illustrating the phases present.
Figure 8:
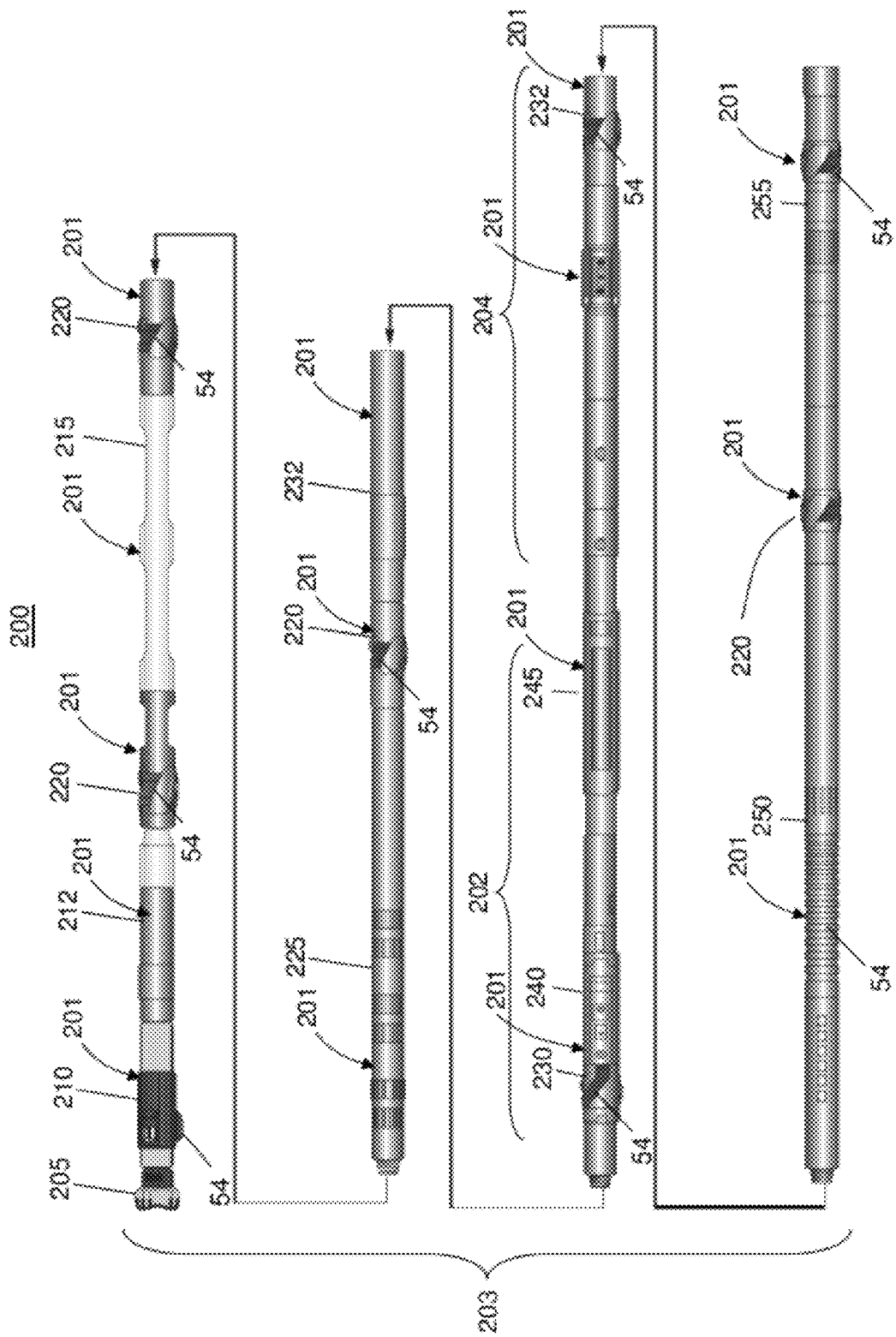
FIG. 8 is an exemplary embodiment of a drill string and exemplary embodiments of various drill string members as disclosed herein.
Figure 9A:
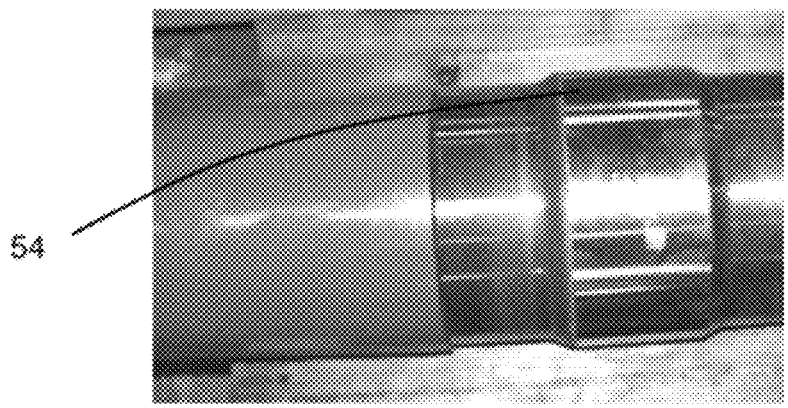
FIGS. 9A-G is a schematic illustration of an exemplary embodiment of a drill string assembly and exemplary embodiments of various drill string members as disclosed herein.
Figure 9B:
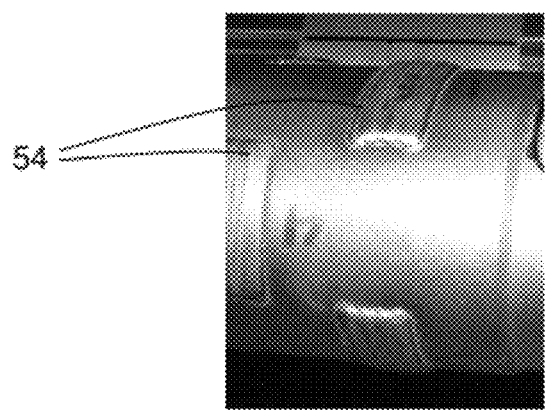
Figure 9C:
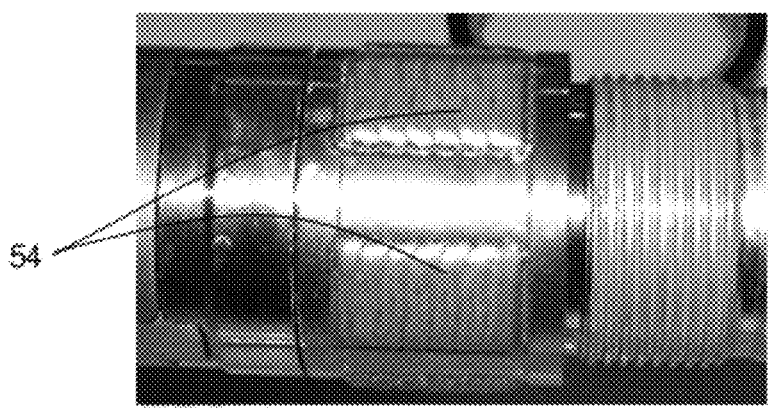
Figure 9D:
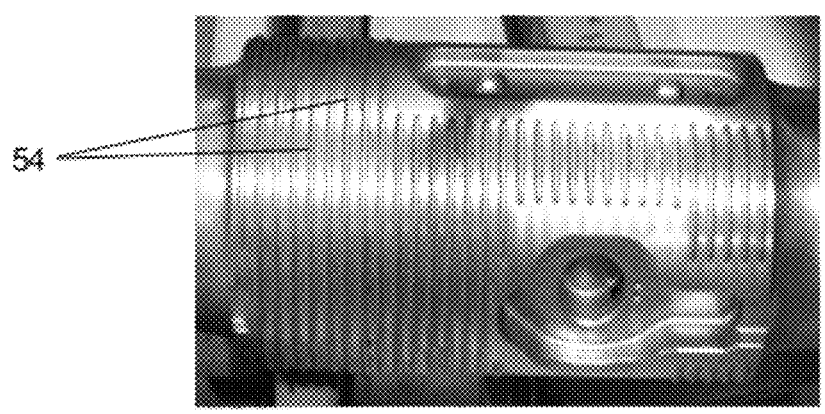
Figure 9E:
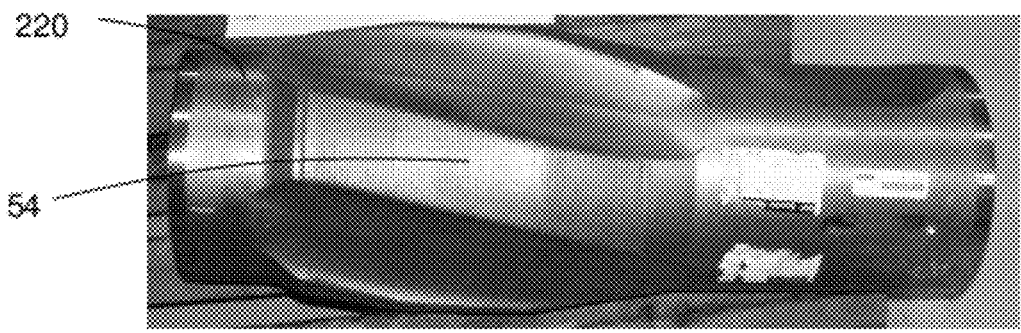
Figure 9F:
Figure 9G:
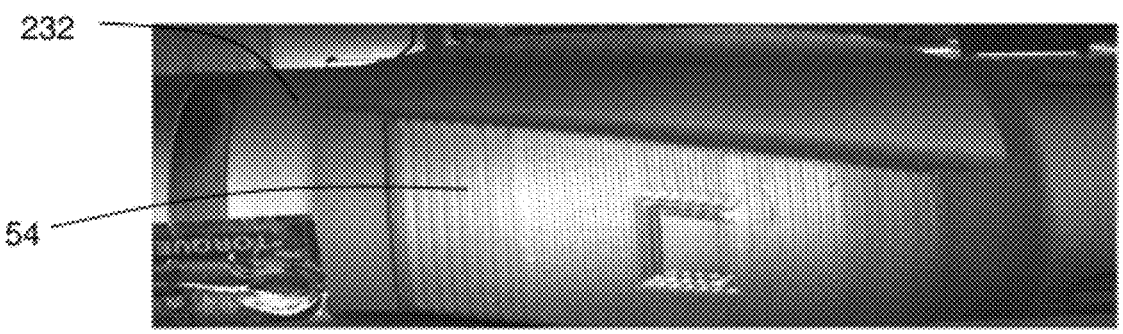

The non-magnetic, sintered carbides 56 comprise metal matrix-carbide composite materials that are also sometimes referred to generally as cemented carbides. FIG. 4 is an optical photomicrograph that illustrates a plurality of non-magnetic, sintered carbides 56 as described herein, including substantially spherical, non-magnetic, sintered carbide pellets 57. As illustrated in FIG. 5, each non-magnetic, sintered carbide pellet 56 includes a non-magnetic, carbide phase 100 (the lighter phase), generally including a plurality of non-magnetic, metal carbide particles 112, and a non-magnetic binder phase 120 (the darker phase), which is generally a softer, continuous, non-magnetic, metallic phase that provides a binder 122 for the hard carbide phase 100. The carbide phase 100 may comprise any suitable non-magnetic carbide, including various non-magnetic metal carbide particles 112 of the elements of Groups IVB, VB, and VIB, and more particularly may include chromium carbide, molybdenum carbide, niobium carbide, tantalum carbide, titanium carbide, tungsten carbide or vanadium carbide, or a combination thereof, and including alloys and mixtures thereof. Even more particularly, in an exemplary embodiment the non-magnetic carbide phase 100 may include metal carbide particles 112 comprising tungsten carbide particles, and more particularly WC particles (FIG. 5). The non-magnetic, carbide phase 100 may have any suitable particle shape of non-magnetic metal carbide particles 112, and may include shapes ranging from substantially spherical shapes, to smoothed irregular shapes to crushed particle shapes, or a combination thereof. In one exemplary embodiment, the non-magnetic, metal carbide particles 112 may have a substantially spherical shape. In another exemplary embodiment, the non-magnetic, metal carbide particles 112 may have smoothed irregular shapes such that they are not true spheres, but are substantially missing the defined corners, sharp edges, angular projections, asperities and other features commonly found in crushed and other non-spherical carbide particles. The non-magnetic, carbide phase 100 may have non-magnetic, metal carbide particles 112 having any suitable particle size, and in one exemplary embodiment may have an average particle size, as measured using standard ASTM sieve mesh sizes, of about 10 microns or smaller, and even more particularly, about 2 microns or smaller. It should be noted that the non-magnetic, carbide particle phase may include alloys and mixtures of carbides that have relatively higher and lower magnetic susceptibilities or permeabilities, so long as the mixture or alloy of the carbides provides non-magnetic, sintered carbides pellets 56 that yield a non-magnetic, abrasive, wear-resistant material 54 when applied to a drill string member, such as a drill string member 201 (FIG. 8). Metal carbide phase 100, including non-magnetic, metal carbide particles 112 may include about 90 to about 100 percent by weight of non-magnetic, sintered carbides 56; and more particularly, about 92 to about 97 percent by weight thereof; and even more particularly, about 93.5 to about 94.5 percent by weight thereof.

The non-magnetic binder phase 120 may be any suitable non-magnetic binder 122, and may include various non-magnetic metals, and more particularly may include various non-magnetic nickel alloys. FIG. 5 illustrates an exemplary non-magnetic binder 122 that comprises a nickel alloy binder. Non-magnetic nickel binder alloys may include Cr, Mo, Fe or V, or a combination thereof, as alloy constituents. The binder 122 may comprise a nickel alloy that includes, for example, up to about 1.5 percent by weight of Cr, which reduces the magnetic permeability of the binder and the non-magnetic, sintered carbides 56 into which it is incorporated. The Cr is also a carbide scavenger, and a grain refiner, which reduces the propensity for grain growth in the metal carbide phase 100 (e.g., WC grains) during the sintering process used to form non-magnetic, sintered carbides 56. The Cr also promotes the sintering process and also serves as strengthening constituent to improve the mechanical properties of the binder. In an exemplary embodiment, a nickel alloy binder may comprise about 0.01 to about 1.5 percent by weight of Cr; and more particularly, may comprise about 0.2 to about 1.0 percent by weight thereof; and even more particularly, may comprise about 0.4 to about 0.8 percent by weight thereof. The binder 122 may include about 0 to about 10 percent by weight of the non-magnetic, sintered carbide pellet 56; and more particularly, about 3 to about 8 percent by weight thereof; and even more particularly, about 5.5 to about 6.5 percent by weight. The selection of the non-magnetic binder phase 120 may take into consideration diffusion effects with the carbide phase 100 during the manufacture of non-magnetic, sintered carbides 56, so as to maintain the non-magnetic nature of the pellets, such as by avoiding the formation of relatively higher magnetic permeability phases by interdiffusion between the constituents of the pellets and binder during the sintering process. The selection of the non-magnetic binder phase 120 may also take into consideration diffusion effects with the constituents of the non-magnetic matrix alloy 60 during deposition of the non-magnetic, abrasive, wear-resistant material 54, so as to maintain the non-magnetic nature of the material, as well as diffusion effects with the constituents of the tool or component onto which the non-magnetic hardfacing material is disposed, so as to maintain the non-magnetic nature of the portion of the tool or component to which the hardfacing is applied.

The non-magnetic, sintered carbides 56 comprise crystals or particles of non-magnetic, metal carbide particles 112 that are sintered together with a non-magnetic binder 122 material, generally in the form of particles (not shown) of the binder material, to form the pellet configurations described herein having the carbide phase 100, including metal carbide particles 112, and non-magnetic binder phase 120, including the binder 122. The non-magnetic, sintered carbides 56 may be formed by any suitable method, including forming precursor pellet particles by compacting a powder mixture of the carbide phase 100 powder particles and the binder phase 120 powder particles, wherein the unsintered precursor pellet particles may be substantially spheroidal with a partially porous internal structure and an average precursor particle size that is greater than the desired pellet; heating the precursor pellet particles, such as by introducing them into a furnace; sintering the precursor pellet particles by heating them to a temperature at which the material of the metallic binder adopts a pasty state (partially liquid and partially solid) and applying a gas pressure to reduce the pore content of the partially porous internal structure, thereby reducing the average particle size to a predetermined end product particle size of pellets 56, such as a predetermined average particle size as described herein, and provide pellets that are substantially free of porosity The resulting pellets may also be ball-milled to round off any sharp edges and corners and eliminate splintery particles of small cross section, which could easily go into solution with the matrix material, and to form the substantially spherical non-magnetic, sintered carbides 56 described herein.

A method of manufacturing non-magnetic, cast metal carbide particles, such as tungsten carbide, includes heating tungsten carbide to about 150-300° C. above the melting point, and then smelting and granulating the tungsten carbide using a rotating cooled table in a stationary inert gas. The method provides cast metal carbide particles that are generally spherical in shape. These cast pellets are not truly spherical, but are sufficiently symmetrical that residual stresses in the pellets are minimized. Also, the generally spherical shape of these pellets eliminates corners, sharp edges, and angular projections, which are present in conventional crushed particles and that increase residual stresses in the particles and tend to melt as the hardfacing material is applied to the surface.

Corners, sharp edges, and angular projections may produce residual stresses, which may cause the metal carbide material (e.g., tungsten carbide) in the regions of the particles proximate the residual stresses to melt at lower temperatures during application of the non-magnetic, abrasive, wear-resistant material 54 to a surface of a drill string member 201 as described herein. Melting or partial melting of the metal carbide material during application may facilitate atomic diffusion between the carbide particles and the surrounding matrix alloy. As previously discussed herein, atomic diffusion between the non-magnetic matrix alloy 60 and the non-magnetic, sintered tungsten carbides 56 and cast tungsten carbides 58 may embrittle the non-magnetic matrix alloy 60 in regions surrounding the cast metal carbides 58 and reduce the hardness of the particles in the outer regions thereof. Such atomic diffusion may degrade the overall physical properties of the non-magnetic, abrasive, wear-resistant material 54. The use of sintered tungsten carbides 56 and cast tungsten carbides 58 instead of conventional tungsten carbide particles that include corners, sharp edges, and angular projections may reduce such atomic diffusion, thereby preserving the physical properties of the non-magnetic matrix alloy 60, the non-magnetic, sintered tungsten carbides 56, and the non-magnetic, cast tungsten carbides 58 during application of the non-magnetic, abrasive, wear-resistant material 54 to the surfaces of drill bits and other tools.

The non-magnetic, abrasive, wear-resistant material 54 may include non-magnetic sintered carbides 56 and non-magnetic matrix alloy 60, as well as non-magnetic cast carbides 58 when used, in any suitable relative amounts. Further, non-magnetic sintered carbides 56 may include substantially spherical sintered carbide pellets 57 or crushed sintered carbide particles 59, or a combination thereof, in any suitable relative amounts. Still further, when used, non-magnetic cast carbides 58 may similarly include substantially spherical cast carbide pellets 61 or crushed sintered carbide particles 59, or a combination thereof, in any suitable relative amounts. Several exemplary combinations of non-magnetic sintered carbides 56 and non-magnetic matrix alloy 60, as well as non-magnetic cast carbides 58, which may be used to form non-magnetic, abrasive, wear-resistant material 54 are provided in Table 1. The combinations and relative amounts of the constituents described in Table 1 are not to be construed as limiting the composition of the non-magnetic, abrasive, wear-resistant materials 54 disclosed herein, but are only examples of how the constituents materials described herein may be combined. In an exemplary embodiment, the non-magnetic, abrasive, wear-resistant material 54 includes a non-magnetic matrix alloy 60 comprising Ni, a plurality of non-magnetic sintered metal carbides 56 comprising sintered tungsten carbide pellets each formed of a plurality of WC particles in an Ni alloy binder and a plurality of non-magnetic, cast metal carbides 58 comprising cast tungsten carbide as illustrated in FIG. 3. The non-magnetic matrix alloy 60 may comprise between about 20% to about 60% by weight of the non-magnetic, abrasive, wear-resistant material 54. More particularly, the non-magnetic matrix alloy 60 may comprise between about 30% to about 50% by weight of the non-magnetic, abrasive, wear-resistant material 54. Even more particularly, the non-magnetic matrix alloy 60 may comprise between about 35% to about 45% by weight of the non-magnetic, abrasive, wear-resistant material 54. The plurality of sintered tungsten and cast and other carbides may comprise between about 40% to about 80% by weight of the non-magnetic, abrasive, wear-resistant material 54. Furthermore, the plurality of sintered tungsten carbides 56 may comprise between about 40% to about 80% by weight of the non-magnetic, abrasive, wear-resistant material 54, and the plurality of cast tungsten carbides 58 may comprise between about 0% to about 60% by weight of the non-magnetic, abrasive, wear-resistant material 54. In a non-limiting example, the non-magnetic, abrasive, wear-resistant material 54 may comprise, by weight, about 30% of matrix alloy 60, about 50% of sintered tungsten carbides 56 and about 20% of cast tungsten carbides 58.

The non-magnetic, sintered tungsten carbides 56 may be larger in size than the non-magnetic, cast tungsten carbides 58. Furthermore, the number of cast tungsten carbide particles 56 per unit volume of the non-magnetic, abrasive, wear-resistant material 54 may be higher than the number of sintered tungsten carbides 58 per unit volume of the non-magnetic, abrasive, wear-resistant material 54.

The non-magnetic, sintered carbides 56 may, for example, include −16 ASTM mesh pellets and have an average diameter of less than about 1180 microns. The average diameter of the non-magnetic, sintered tungsten carbides 56 may be between about 1.1 times and about 5 times greater than the average diameter of the non-magnetic, cast tungsten carbides 58. The non-magnetic, cast tungsten carbides 58 may, for example, include −100 ASTM mesh particles and have an average diameter of less than about 150 microns.

TABLE 1

| Non-Magnetic Matrix Alloy (Wt. %) | Non-Magnetic Spherical Sintered Carbide Pellets (Wt. %) | Non-Magnetic Spherical Cast Tungsten Carbide Pellets (Wt. %) | Non-Magnetic Crushed Sintered Carbide Granules (Wt. %) | Non-Magnetic Crushed Cast Carbide Granules (Wt. %) | Other Non Magnetic Carbides (Wt. %) |
|---|---|---|---|---|---|
| 20 | 40 | 10 | 30 | | |
| 20 | 60 | 15 | | | 5 |
| 20 | 40 | 10 | 10 | 10 | 10 |
| 30 | 35 | 5 | 10 | 5 | |
| 30 | 70 | | | | |
| 30 | 35 | 35 | | | |
| 40 | 60 | | | | |
| 40 | 45 | 15 | | | |
| 40 | 35 | 10 | 10 | | 5 |
| 50 | 25 | 25 | | | |
| 50 | 25 | 5 | 10 | 10 | |
| 50 | 35 | 10 | | | 5 |
| 60 | 20 | 10 | | 10 | |
| 60 | 25 | | | 5 | 5 |
| 60 | 20 | 10 | 5 | 5 | |

As an example, the non-magnetic, sintered tungsten carbides 56 may have any suitable pellet size or range of sizes, including an ASTM mesh size range of about −16 mesh to about +325 mesh. More particularly, the pellets may range from about −20 to about +140 mesh, and even more particularly may range from about −20 to about +80 mesh. The non-magnetic, cast tungsten carbides 58 may have any suitable particle size or range of sizes, including an ASTM mesh size range of about 100 to about +270 mesh. More particularly, the particles may range from about −100 to about +200 mesh, and even more particularly may range from about −140 to about +200 mesh.

As another example, the plurality of sintered tungsten carbides 56 may include a plurality of −60/+80 ASTM mesh sintered tungsten carbide pellets and a plurality of −120/+270 ASTM mesh sintered tungsten carbide pellets. The non-magnetic, abrasive, wear-resistant material 54 may include, by weight, between about 30% and about 50% of −60/+80 ASTM mesh sintered tungsten carbide pellets and between about 15% and about 20% of 120/+270 ASTM mesh sintered tungsten carbide pellets.

Cast and sintered pellets of carbides other than tungsten carbide also may be used to provide non-magnetic, abrasive, wear-resistant material 54. Such other carbides include chromium carbide, molybdenum carbide, niobium carbide, tantalum carbide, titanium carbide or vanadium carbide, or a combination thereof.

The non-magnetic matrix alloy 60 may include a non-magnetic metal alloy material. Any suitable non-magnetic metal alloy material may be used for non-magnetic matrix alloy 60, including a nickel-base, aluminum-base, copper-base, magnesium-base or titanium-base alloy, or a combination thereof. In one exemplary embodiment, the non-magnetic metal alloy material may include a nickel-based alloy, and more particularly may include about 50 weight percent or more of nickel, and the balance at least one other alloy constituent that provides a non-magnetic nickel-base alloy material, and more particularly, may include C, Cr, Mo, Fe, Mn, Si, V, W, Cu, Nb, P, Al or B, or a combination thereof. In addition to an alloying constituent, the non-magnetic matrix alloy 60 also may employ a flux material, such as silicomanganese, or a binder, such as a polymer material. In one embodiment, the at least one alloying constituent comprises, in weight percent, about 0.10 to about 0.74 C, up to about 3.50 B, about 1.00 to about 4.50 Fe, about 2.25 to about 4.55 Si, up to about 14.00 Cr, and a balance of Ni. In another embodiment, the at least one alloying constituent comprises, in weight percent, about 0.10 to about 0.74 C, about 1.4 to about 3.50 B, about 1.00 to about 4.50 Fe, about 2.25 to about 4.55 Si, up to about 14.00 Cr, and a balance of Ni.

In one embodiment, the non-magnetic matrix alloy 60 comprises, by weight percent of the alloy, about 0.01 to about 0.5 C, about 1.0 to about 4.0 B, about 2.0 to about 5.0 Si, and the balance Ni. In another embodiment, the non-magnetic matrix alloy 60 comprises, by weight percent of the alloy, about 0.05 to about 0.3 B, about 3.0 to about 5.5 Al and the balance Ni. In another embodiment, the non-magnetic matrix alloy 60 comprises, by weight percent of the alloy, about 20.0 to about 23.0 Cr, about 0.5 to about 3.0 Fe, about 8.0 to about 10.0 Mo, about 3.0 to about 4.0 Nb, about 0.3 to about 0.7 Si, about 0.3 to about 0.7 Mn, and the balance Ni. In yet another embodiment, the non-magnetic matrix alloy 60 comprises, by weight percent of the alloy, about 14.5 to about 16.5 Cr, about 4.0 to about 7.0 Fe, about 15.0 to about 17.0 Mo, about 3.0 to about 4.5 W, about 0.3 to about 0.7 Si, about 0.5 to about 1.0 Mn, about 0.1 to about 0.4 V, and the balance Ni.

In one exemplary embodiment, the non-magnetic matrix alloy 60 may comprise a ferromagnetic material that has a Curie temperature that is below a predetermined operating temperature range of the drill string member 201 on which it is to be employed, such as, for example, if a predetermined range of operating temperatures are all greater than an ambient temperature, the Curie temperature may be selected to be below the ambient temperature (e.g., 25° C.), so that the alloy is non-magnetic over the entire range of predetermined operating temperatures that are greater than the ambient temperature. The non-magnetic matrix alloy 60, including the alloy constituents, may be selected to provide a predetermined Curie temperature that is below a predetermined operating temperature limit. For example, in Ni-base alloys, Cr or Mo alloying additions, or a combination thereof, may be used to lower the Curie temperature from that of pure nickel, which is about 358° C. to a predetermined Curie temperature as an operating limit.

In one exemplary embodiment, the non-magnetic matrix alloy 60 may have a melting point that is lower than the melting point of the non-magnetic binder 122. In another exemplary embodiment, the non-magnetic matrix alloy 60 may have a melting point that is lower than the melting point of the non-magnetic binder 122 by at least about 50° C., and particularly between about 50° C. and about 150° C., and more particularly between about 75° C. and about 125° C., and even more particularly about 100° C. In this configuration of the non-magnetic matrix alloy 60 and non-magnetic binder 122, by control of the process used to apply the non-magnetic, abrasive, wear-resistant material 54, the non-magnetic matrix alloy 60 may be melted during application of the material to a surface of a drilling tool or component without melting the non-magnetic binder 122. This control of the melting temperature during application of the material may also be used to prevent the melting of the non-magnetic, cast carbides 58 or the metal carbide particles of the non-magnetic, sintered tungsten carbides 56. This enables the non-magnetic, abrasive, wear-resistant material 54 to be applied to a surface of a drilling tool at lower temperatures to minimize atomic diffusion between the non-magnetic, sintered tungsten carbides 56 and the non-magnetic matrix alloy 60, as well as between the non-magnetic, cast tungsten carbides 58 and the non-magnetic matrix alloy 60 in embodiments where the cast particles are used.

As previously discussed herein, minimizing atomic diffusion between the non-magnetic matrix alloy 60 and the non-magnetic, sintered tungsten carbides 56 and the non-magnetic, cast tungsten carbides 58, helps to preserve the chemical composition and the physical properties of the non-magnetic matrix alloy 60, the non-magnetic, sintered tungsten carbides 56, and the non-magnetic, cast tungsten carbides 58 during application of the non-magnetic, abrasive, wear-resistant material 54 to the surfaces of various drill string members 201, as described herein.

FIG. 5 is an enlarged view of a sintered tungsten carbide pellet 56. The hardness of the sintered tungsten carbide pellet 56 may be substantially consistent throughout the pellet.

The non-magnetic, sintered tungsten carbides 56 may have higher fracture toughness relative to the non-magnetic, cast tungsten carbides 58, while the non-magnetic, cast tungsten carbides 58 may have higher hardness relative to the non-magnetic, sintered tungsten carbides 56. By using matrix alloys 60 as described herein, the fracture toughness of the non-magnetic, sintered tungsten carbides 56 and the hardness of the non-magnetic, cast carbides 58 may be preserved in the non-magnetic, abrasive, wear-resistant material 54 during application of the non-magnetic, abrasive, wear-resistant material 54 to a drill string member 201, thereby providing a non-magnetic, abrasive, wear-resistant material 54 that is improved relative to abrasive, wear-resistant materials known in the art.

The non-magnetic, abrasive, wear-resistant material 54 disclosed may be applied to selected areas, such as the outer wear surfaces that contact the earth formations, of various drill string members 201 of a drill string assembly 200. In one exemplary embodiment, non-magnetic, abrasive, wear-resistant material 54 is particularly well-suited for use as a hard-facing material for various drill string members 201 comprising a drill string assembly 200 frequently referred to as the bottom hole assembly (BHA) as shown in FIG. 8 and FIGS. 9 A-G that generally carries an earth-boring rotary drill bit 205 at its bottom end that is conveyed into the wellbore or borehole. The drilling string assembly 200 is usually conveyed into the wellbore by a coiled-tubing or a drill pipe. In the case of the coiled-tubing, the drill bit may be rotated by a drilling motor 215 or "mud motor" which provides rotational force to the portion of the drill string between the motor and the drill bit when a drilling fluid is pumped from the surface into the coiled-tubing. The drill string may also be rotated by a power source (usually an electric motor) at the surface, which rotates the drill pipe and thus the drill bit 205.

A BHA generally includes various devices, including a various formation sensors and instruments, for determining various parameters of the BHA, or the earth formation surrounding the BHA, during the drilling of the wellbore. Such devices are usually referred to as measurement-while-drilling (MWD) devices 202 or logging-while-drilling (LWD) devices 204. Such devices may include, for example, an automatic steering unit device 210, or a CoPilot™ sub device 212 device, as well as associated sensors and instrumentation. Further, it may include modular mud motor 215 as well as a stabilizer sleeve 220 to stabilize the rotation of the drill string assembly 200 in this portion of the drill string. Still further, it may include an OnTrak™ MWD and LWD device 225 with sensors and instrumentation for measurements that include directional surveys, temperature, azimuthal gamma ray, propagation resistivity, annular pressure or vibration, as well as a stabilizer sleeve 220 associated with this device. Yet further, the BHA may include a bi-directional communications and power module (BDCPM) 232, as well as a stabilizer sleeve 220 associated with this device. The BHA may also include a LithoTrak™ LWD device 202 with sensors and instrumentation for measuring earth formation density, neutron porosity, borehole caliper and formation imaging, as well as a second stabilizer sleeve 230 associated with this device. Further, the BHA may include a TesTrak™ MWD device 204, including an optimized relational density device 240 and caliper corrected neutron device 245, with sensors and instrumentation for measuring formation pressure and pore pressure, as well as a third stabilizer sleeve 232 associated with this device. Yet further, the BHA may include a SoundTrak™ LWD acoustic device 250, with sensors and instrumentation for measuring real time compressional and shear wave travel times, as well as a first stabilizer sleeve 220 associated with this device. Yet further, the BHA may include a MagTrak™ magnetic resonance device 255, with sensors and instrumentation for measuring fluid properties, porosity and fluid volumetric properties. Other drill string members 201 include those that incorporate various electromagnetic propagation sensors and instrumentation for measuring the resistivity, dielectric constant, or water saturation of the formation; nuclear sensors for determining the porosity of the formation and acoustic sensors to determine the formation acoustic velocity and porosity. Other devices include downhole sensors for determining the formation density and permeability. The BHA also may include devices to determine the inclination and azimuth, as well as devices that include pressure sensors, temperature sensors, gamma ray devices, and devices that aid in orienting the drill bit in a particular direction or changing the drilling direction. Acoustic and resistivity devices and associated sensors and instrumentation may be used for determining bed boundaries around and in some cases in front of the drill bit 205. Nuclear magnetic resonance (NMR) devices and associated sensors and instrumentation have been used as MWD devices to provide direct measurement for water saturation porosity and indirect measurements for permeability and other formation parameters of interest.

Figure 7A:
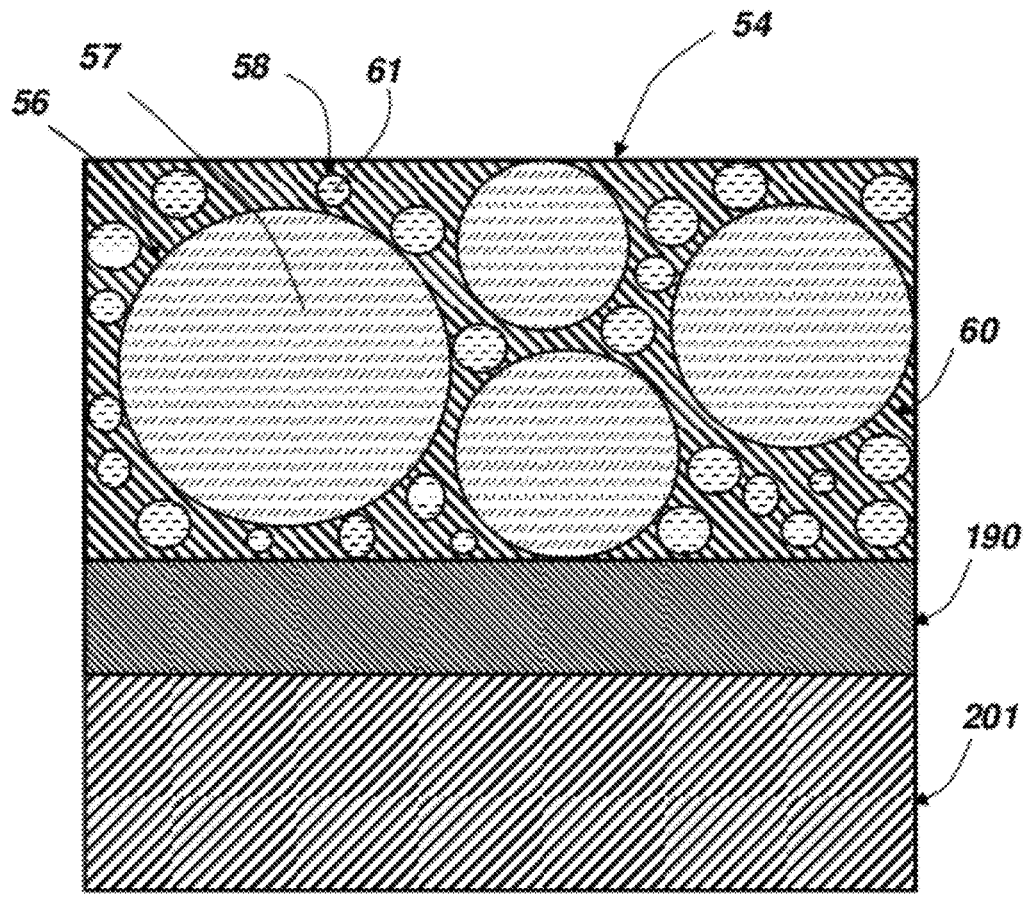
FIG. 7A is a schematic illustration of an embodiment of a non-magnetic hardfacing material as disclosed herein applied to a surface of a drill string member illustrating the interface of the non-magnetic, sintered carbide pellets and matrix alloy of the non-magnetic hardfacing material and the non-magnetic drill string member.
Figure 7B:
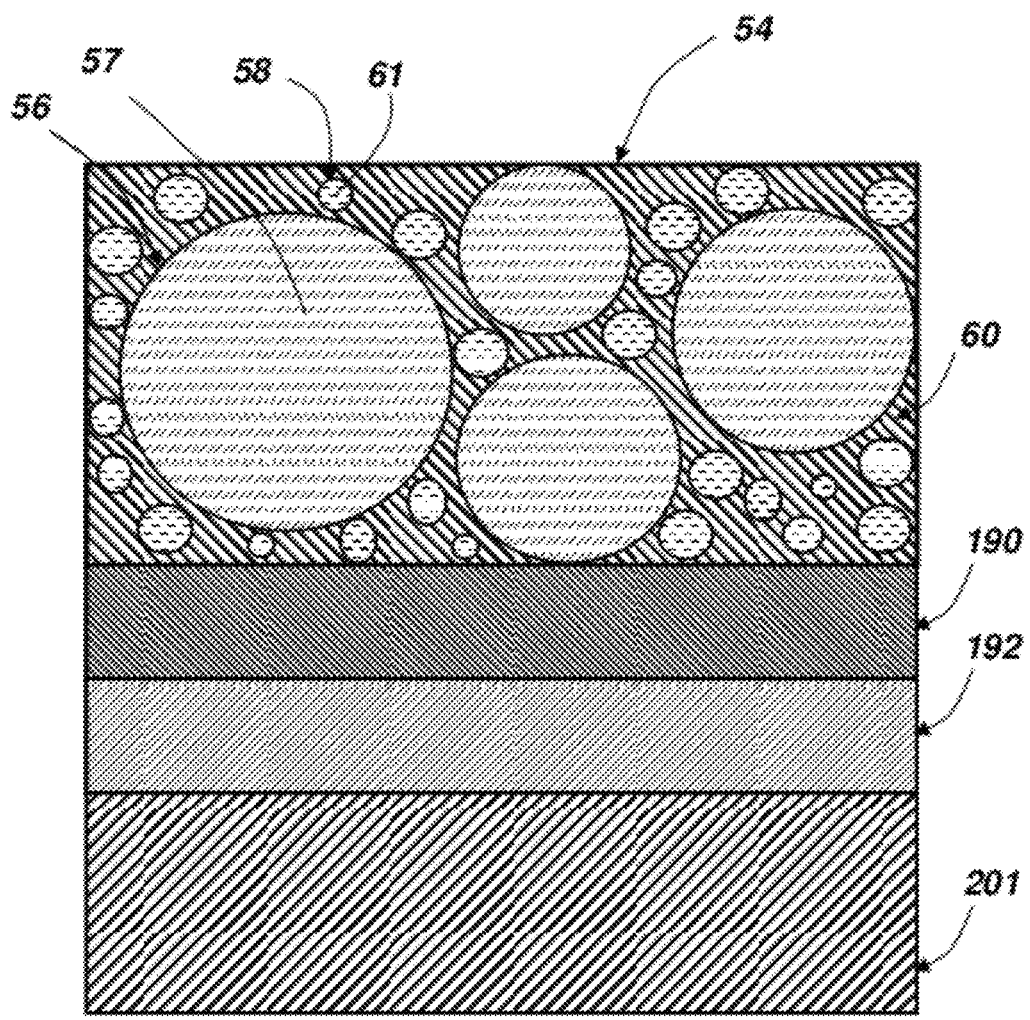
FIG. 7B is a schematic illustration of an embodiment of a non-magnetic hardfacing material as disclosed herein applied to an intermediate material disposed on a surface of a drill string member illustrating the interface of the non-magnetic, sintered carbide pellets and matrix alloy of the non-magnetic hardfacing material and the intermediate material.

The BHA, including MWD or LWD devices, or portions of the drill string associated with these devices, include various drill string members 201, such as drilling collars, stabilizer sleeves, housings or other drill string members, which are located axially or radially proximate (or both) to these devices. As used herein, axially proximate may include axially below (i.e., closer to the bottom of the borehole) or above (i.e., farther from the bottom of the borehole) these devices. As used herein, radially proximate may include radially outward of these devices. The non-magnetic, abrasive, wear-resistant hardfacing material 54 may be applied to any suitable portion of these drill string members 201, particularly an outer surface of these members, and more particularly, an outer surface that has either constant or intermittent contact with an earth formation. The non-magnetic hardfacing material is suitable for application to drill string members 201 that require non-magnetic or at least reduced or controlled magnetic characteristics. For example, the non-magnetic hardfacing material 54 may be used with the drill string members 201 to provide compatibility with instrumentation and sensors utilized in the BHA that must be housed in non-magnetic materials as a design requirement, or to optimize their performance. In an exemplary embodiment, the drill string member 201 may be a substantially cylindrical body having an outer surface. The non-magnetic, abrasive, wear-resistant material 54 may be applied to all or any portion of the outer surface, and may be applied in any suitable shape, pattern or thickness. The non-magnetic, abrasive, wear-resistant material 54 may be applied as one or more helical pads, axially extending pads, completely or partially circumferential bands or rings. The non-magnetic, abrasive, wear-resistant material 54 may also, optionally, be applied in conjunction with a non-magnetic intermediate material 192 that is disposed on the surface of the non-magnetic drill string member 201, between the member and the non-magnetic, abrasive, wear-resistant material 54, as shown in FIG. 7B. The non-magnetic intermediate material 192 may be used to limit the melting of the surface of the non-magnetic drill string member 201 during application of the non-magnetic, abrasive, wear-resistant hardfacing material 54, and thereby reduce the propensity for formation of magnetic phases that may occur in the heat affected zone 190 due to melting of the material at the surface of the drill string member 201. Any suitable material may be used for non-magnetic intermediate material 192, including various Ni-base alloys, such as various Inconel alloys.

Non-magnetic, abrasive, wear-resistant materials that embody teachings of the present invention, such as the non-magnetic, abrasive, wear-resistant material 54, may be applied to the selected surfaces of a drill string member 201 using variations of techniques known in the art. For example, a non-magnetic hardfacing precursor material or pre-application non-magnetic, abrasive, wear-resistant material 54 that embodies teachings of the present invention may be provided in the form of a welding rod formed of the constituents of the non-magnetic, abrasive, wear-resistant material 54 described herein. The welding rod may comprise a solid cast or extruded rod consisting of the non-magnetic, abrasive, wear-resistant material 54. Alternatively, the welding rod may comprise a hollow cylindrical tube formed from the non-magnetic matrix alloy 60 and filled with a plurality of non-magnetic, sintered tungsten carbides 56, as well as a plurality of non-magnetic, cast tungsten carbides 58 where desired. Other forms of the non-magnetic hardfacing precursor materials may also be used, including various free flowing powders or pastes that include the constituents of the non-magnetic, abrasive, wear-resistant material 54 and that may be applied to the surface of the drill string member 201 prior to or in conjunction with heating the material above the melting point of the non-magnetic matrix material, as described herein.

Figure 10:
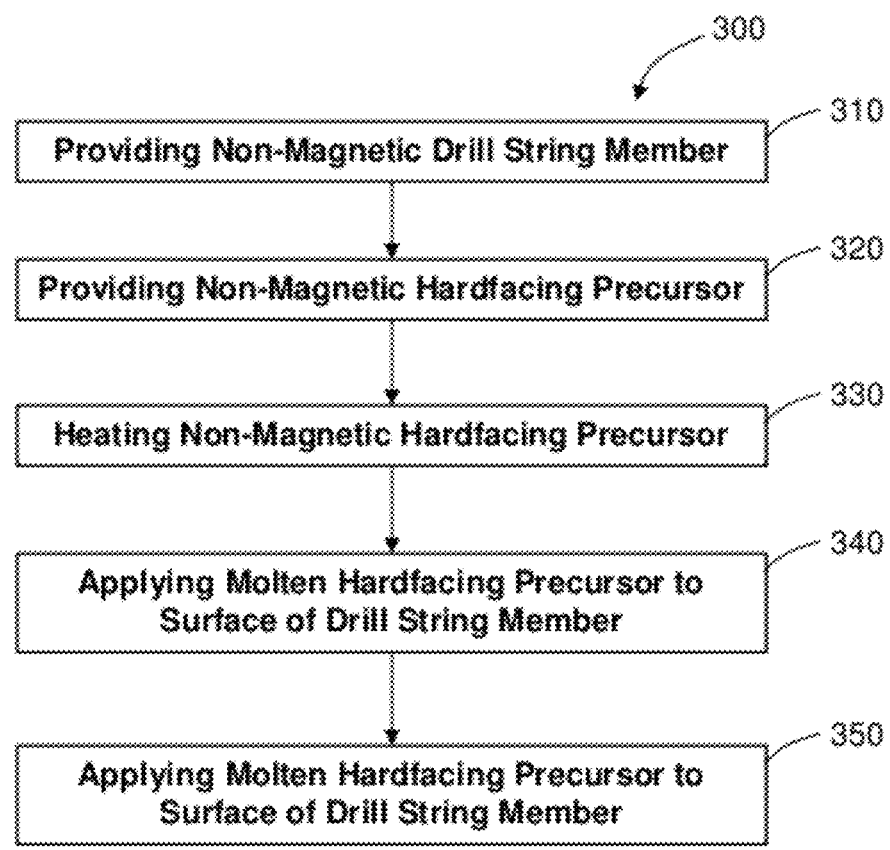
FIG. 10 is an exemplary embodiment of a method of making a non-magnetic drill string member having a non-magnetic hardfacing material disposed thereon as disclosed herein.

Referring to FIG. 10, a method 300 for applying a non-magnetic, abrasive, wear-resistant hardfacing material 54 to a surface of a drill string member 201 is disclosed. The method 300 includes providing 310 a non-magnetic drill string member 201 formed of a non-magnetic material and having an outer surface. The method 300 also includes providing 320 a non-magnetic hardfacing precursor material comprising a plurality of non-magnetic, sintered carbides 56 and a non-magnetic matrix material 60. Further, the method 300 includes heating 330 a portion of the non-magnetic hardfacing precursor material to a temperature above the melting point of the non-magnetic matrix material 60 to melt the matrix material. Still further, the method includes applying 340 the molten non-magnetic matrix material 60 and the plurality of non-magnetic, sintered carbides 56 to the exterior surface of the drill string member 201. Finally, the method 300 includes solidifying 350 the molten non-magnetic matrix material 60 to form a layer of a non-magnetic hardfacing material 54 having a plurality of non-magnetic, sintered carbides 56 dispersed in the hardfacing material.

Heating 330 of the non-magnetic hardfacing precursor as described herein may be accomplished by any suitable heating device or heating method. The non-magnetic hardfacing precursor and thus the non-magnetic, abrasive, wear-resistant material 54 may be selected, including selection of the constituent materials and their sizes and relative amounts, based on the heating device or heating method selected.

In an exemplary embodiment, any suitable type of welding torch or welding apparatus may be used to heat at least a portion of a welding rod of the hardfacing precursor material to a predetermined temperature above the melting point of the non-magnetic matrix alloy 60. The predetermined temperature may be selected to, for example, to minimize the extent of atomic diffusion occurring between the non-magnetic matrix alloy 60 and the non-magnetic, sintered carbides 56, as well as non-magnetic, cast carbides 58 when they are employed. The predetermined temperature may also be selected to, for example, control the temperature of the surface onto which the non-magnetic, abrasive, wear-resistant hardfacing material 54 is deposited by welding, and more particularly, the nature of the heat affected zone 190 as shown in FIG. 7A. While the predetermined temperature will generally be selected to provide some melting of the surface, it must be controlled to limit the diffusion from the surface of the non-magnetic drill string member 201 into the heat affected zone or the non-magnetic, abrasive, wear-resistant hardfacing material 54. More particularly, it should be controlled to minimize melting of the surface and associated diffusion sufficient to enable the formation of magnetic phases within the non-magnetic, abrasive, wear-resistant hardfacing material 54, heat affected zone 190 or drill string member 201. For example, in the case where the surface of the drill string member 201 comprises a non-magnetic stainless steel, such as an austenitic stainless steel, the heating of the surface of the drill string member 201 should be controlled to minimize melting and diffusion of the surface of the drill string member sufficient to enable the formation of magnetic phases, such as ferrite, in either of the non-magnetic, abrasive, wear-resistant hardfacing material 54, heat affected zone 190 or drill string member 201.

The rate of atomic diffusion occurring between the non-magnetic matrix alloy 60 and the non-magnetic, sintered carbides 56 and non-magnetic, cast carbides 58 is at least partially a function of the temperature at which atomic diffusion occurs. The extent of atomic diffusion, therefore, is at least partially a function of both the temperature at which atomic diffusion occurs and the time for which atomic diffusion is allowed to occur. Therefore, the extent of atomic diffusion occurring between the non-magnetic matrix alloy 60 and the non-magnetic, sintered carbides 56 and non-magnetic, cast carbides 58 may be controlled by controlling welding parameters, including the distance and angle between the torch and the welding rod (or precursor non-magnetic, abrasive, wear-resistant material), and the time for which the welding rod is subjected to heat produced by the torch and other factors.

It is necessary to slightly melt the surface of the drill string member to which the non-magnetic, abrasive, wear-resistant material 54 is to be applied just prior to applying the non-magnetic, abrasive, wear-resistant material 54 to the surface. For example, an oxygen/acetylene or atomic hydrogen torch may be brought in close proximity to a surface of a drill string member and used to heat to the surface to a sufficiently high temperature to slightly melt or "sweat" the surface. The welding rod comprising the non-magnetic hardfacing precursor material 54 then may be brought in close proximity to the surface and the distance between the torch and the welding rod may be adjusted to heat at least a portion of the welding rod to a temperature above the melting point of the non-magnetic matrix alloy 60. The molten non-magnetic matrix alloy 60, at least some of the non-magnetic, sintered tungsten carbides 56, and at least some of the non-magnetic, cast tungsten carbides 58 may be applied to the surface of the drill string member, and the molten matrix alloy 60 may be solidified by controlled cooling. The rate of cooling may be controlled to control the microstructure and physical properties of the non-magnetic, abrasive, wear-resistant material 54 and the surface of the drill string member.

Alternatively, the non-magnetic, abrasive, wear-resistant material 54 may be applied to a surface of a drill string member using an arc welding technique, such as a plasma transferred arc (PTA) welding technique. For example, the non-magnetic matrix alloy 60 may be provided in the form of a powder (small particles of matrix alloy 60). A plurality of sintered tungsten carbides 56 and a plurality of cast tungsten carbides 58 may be mixed with the powdered matrix alloy 60 to provide a precursor hardfacing material in the form of a powder mixture. A plasma transferred arc welding machine then may be used to heat at least a portion of the pre-application wear-resistant material to a temperature above the melting point of the non-magnetic matrix alloy 60.

Plasma transferred arc welding machines typically include a non-consumable electrode that may be brought in close proximity to the substrate (drill string member) to which material is to be applied. A plasma-forming gas is provided between the substrate and the non-consumable electrode, typically in the form a column of flowing gas. An arc is generated between the electrode and the substrate to generate a plasma in the plasma-forming gas. The powdered precursor hardfacing material may be directed through the plasma and onto a surface of the substrate using an inert carrier gas. As the powdered precursor hardfacing material passes through the plasma it is heated to a temperature at which at least some of the precursor hardfacing material will melt. Once the at least partially molten precursor hardfacing material has been deposited on the surface of the substrate, the precursor hardfacing material is allowed to solidify. Such plasma transferred arc welding machines are known in the art and commercially available.

The temperature to which the precursor hardfacing material is heated as the material passes through the plasma may be at least partially controlled by controlling the current passing between the electrode and the substrate. For example, the current may be pulsed at a selected pulse rate between a high current and a low current. The low current may be selected to be sufficiently high to melt at least the non-magnetic matrix alloy 60 in the precursor hardfacing material, and the high current may be sufficiently high to melt or sweat the surface of the substrate. Alternatively, the low current may be selected to be too low to melt any of the precursor hardfacing material, and the high current may be sufficiently high to heat at least a portion of the pre-application wear-resistant material to a temperature above the melting point of the non-magnetic matrix alloy 60. This may minimize the extent of atomic diffusion occurring between the non-magnetic matrix alloy 60 and the non-magnetic, sintered tungsten carbides 56 and cast tungsten carbides 58.

Other welding techniques, including various arc welding techniques, such as metal inert gas (MIG) arc welding techniques and tungsten inert gas (TIG) arc welding techniques, as well as various laser welding techniques, may also be used to apply the precursor hardfacing material to a surface of a drill string member. Depending on the capability of the welding method and associated equipment selected, the equipment may be operated in a continuous or pulsed mode, or a combination thereof. Flame spray welding, laser cladding and IR cladding techniques are also known in the art and may also be used to apply the precursor hardfacing material.

Figure 11:
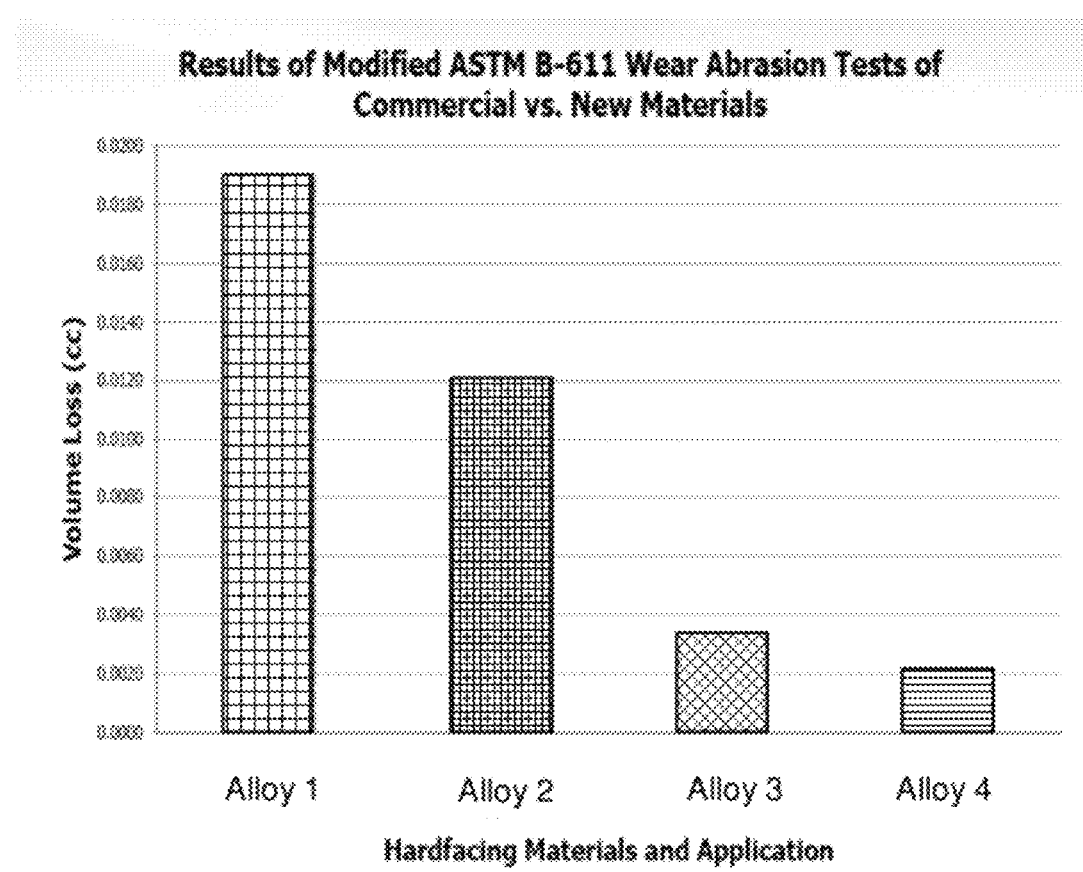
FIG. 11 is a plot of wear resistance for various hardfacing materials, including embodiments of the non-magnetic hardfacing materials disclosed herein.

The non-magnetic, abrasive, wear-resistant material 54 described herein provides enhanced wear resistance over non-magnetic hardfacing materials made using only cast non-magnetic carbide particles in a non-magnetic matrix material. The improvements are illustrated generally in FIG. 11. Two existing non-magnetic hardfacing materials that included cast carbide particles in a non-magnetic alloy matrix are shown as Alloy 1 and Alloy 2, respectively. Alloy 1 was applied to a non-magnetic substrate using a laser to melt the precursor hardfacing material and form the hardfacing on the substrate. Alloy 2 was applied using oxygen/acetylene welding to melt the precursor hardfacing material and form the hardfacing on the substrate. Two non-magnetic, abrasive, wear-resistant materials 54 are shown as Alloy 3 and Alloy 4, respectively. Alloy 3 and 4 included sintered tungsten carbides 56 and cast tungsten carbides 58 in a non-magnetic matrix alloy 60 as described herein. Alloy 3 was also applied using oxygen/acetylene welding to melt the precursor hardfacing material and form the hardfacing on the substrate. Alloy was applied using plasma transferred arc welding to melt the precursor hardfacing material and form the hardfacing on the substrate. These alloys were tested in a modified ASTM B-611 wear simulation test. The materials disclosed herein demonstrate a substantially improved wear resistance compared to commercially available non-magnetic hardfacing materials as illustrated in FIG. 11.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method for applying a non-magnetic, abrasive, wear-resistant hardfacing material to a surface of a drill string member, comprising:
    providing a non-magnetic drill string member formed of a non-magnetic material, the drill string member having an outer surface;
    disposing a non-magnetic intermediate material on the outer surface of the drill string member, the intermediate material having an outer surface away from the drill string member;
    providing a non-magnetic hardfacing precursor material comprising a plurality of non-magnetic, sintered carbide pellets and a non-magnetic matrix material;
    heating a portion of the non-magnetic hardfacing precursor material to a temperature above the melting point of the matrix material to melt the matrix material;
    applying the molten non-magnetic matrix material and the plurality of non-magnetic, sintered carbide pellets to the outer surface of the intermediate material; and
    solidifying the molten non-magnetic matrix material to form a layer of a non-magnetic hardfacing material having a plurality of non-magnetic, sintered carbide pellets dispersed in the hardfacing material and a heat affected zone proximate the outer surface of the intermediate material, the heat affected zone and the layer of the non-magnetic hardfacing material spaced from the outer surface of the drill string member.

2. The method of claim 1, wherein the hardfacing precursor further comprises a plurality of non-magnetic, cast carbide particles.

3. The method of claim 1, wherein the non-magnetic, sintered carbide pellets comprise a non-magnetic binder; and a plurality of particles of a non-magnetic, metal carbide dispersed within the non-magnetic binder.

4. The method of claim 1, wherein the outer surface of the non-magnetic drill string member comprises an outer surface of a bottom hole assembly.

5. The method of claim 4, wherein the bottom hole assembly comprises a measurement-while-drilling device or a logging-while-drilling device.

6. The method of claim 4, wherein the bottom hole assembly comprises a drilling collar, stabilizer sleeve or device housing, or a combination thereof.

7. The method of claim 1, wherein providing the non-magnetic precursor hardfacing material comprises providing a welding rod comprising the non-magnetic precursor hardfacing material or providing a powder of the non-magnetic precursor hardfacing material.

8. The method of claim 1, wherein heating the non-magnetic hardfacing precursor material is performed by oxy-acetylene welding, atomic hydrogen torch welding, plasma transferred arc welding, metal inert gas welding, tungsten inert gas welding, flame spray welding or laser welding, or a combination thereof.

9. The method of claim 3, wherein the non-magnetic metal carbide particles comprise tungsten carbide and the non-magnetic binder comprises a nickel alloy.

10. A drill string member, comprising:
a drill string member having an outer surface;
a non-magnetic intermediate material on the outer surface of the drill string member, the intermediate material having an outer surface away from the drill string member; and
a non-magnetic, abrasive, wear-resistant hardfacing material disposed on the outer surface of the intermediate material and heat affected proximate the outer surface of the intermediate material, the heat affected zone and the layer of the non-magnetic hardfacing material spaced from the outer surface of the drill string member, the non-magnetic hardfacing material configured for contact with an earth formation, the non-magnetic hardfacing material comprising a plurality of non-magnetic, sintered carbide pellets dispersed in a non-magnetic matrix material, the non-magnetic, abrasive, wear-resistant hardfacing disposed by a method of applying, comprising:
providing the non-magnetic drill string member formed of a non-magnetic material;
providing a non-magnetic hardfacing precursor material comprising the plurality of non-magnetic, sintered carbide pellets and the non-magnetic matrix material;
heating a portion of the non-magnetic hardfacing precursor material to a temperature above the melting point of the matrix material to melt the matrix material;
applying the molten non-magnetic matrix material and the plurality of non-magnetic, sintered carbide pellets to the exterior surface of the drill string member; and
solidifying the molten non-magnetic matrix material to form a layer of the non-magnetic hardfacing material having the plurality of non-magnetic, sintered carbide pellets dispersed in the hardfacing material.

11. The drill string member of claim 10, further comprising a plurality of non-magnetic, cast carbide particles dispersed within the non-magnetic matrix alloy.

12. The drill string member of claim 10, wherein each of the non-magnetic, sintered carbide pellets comprise:
a non-magnetic binder; and
a plurality of particles of a non-magnetic, metal carbide dispersed within the non-magnetic binder.

13. The drill string member of claim 12, wherein the metal carbide comprises chromium carbide, molybdenum carbide, niobium carbide, tantalum carbide, titanium carbide, tungsten carbide, silicon carbide or vanadium carbide, or a combination thereof.

14. The drill string member of claim 12, wherein the metal carbide comprises WC.

15. The drill string member of claim 12, wherein the metal carbide comprises about 90 to about 98 percent by weight of the pellet.

16. The drill string member of claim 12, wherein the particles of metal carbide have an average size of about 10 microns or less.

17. The drill string member of claim 12, wherein the particles of metal carbide are substantially spherical.

18. The drill string member of claim 12, wherein the binder comprises a non-magnetic metal.

19. The drill string member of claim 12, wherein the binder comprises an Ni alloy that includes Cr, Mo, Fe, or V, or a combination thereof.

20. The drill string member of claim 12, wherein the hardfacing material has a relative magnetic permeability of less than or equal to 1.01.

21. The drill string member of claim 10, wherein the non-magnetic, sintered carbide pellets comprise substantially spherical pellets.

22. The drill string member of claim 10, wherein the non-magnetic, sintered carbide pellets comprise crushed pellets.

23. The drill string member of claim 10, wherein the non-magnetic, sintered carbide pellets comprise substantially spherical pellets and crushed pellets.

24. The drill string member of claim 11, wherein the non-magnetic cast carbide particles comprise substantially spherical particle shape, smoothed irregular particle shape or crushed irregular particle shape particles, or a combination thereof.

25. The drill string member of claim 10, wherein the non-magnetic, sintered carbide and the non-magnetic cast carbide comprise about 40 to about 80 percent by weight of the hardfacing material.

26. The drill string member of claim 10, wherein the non-magnetic matrix comprises a metal alloy comprising at least about 50 percent by weight of nickel and a balance of at least one alloying constituent.

27. The drill string member of claim 26, wherein the at least one alloying constituent comprises C, Cr, Mo, Fe, Mn, Si, V, W, Cu, Nb, P, Al or B, or a combination thereof.

28. The drill string member of claim 10, wherein the outer surface of the non-magnetic drill string member comprises an outer surface of a bottom hole assembly.

29. The drill string member of claim 28, wherein the bottom hole assembly comprises a measurement-while-drilling device or a logging-while-drilling device.

30. The drill string member of claim 28, wherein the bottom hole assembly comprises a drilling collar, stabilizer sleeve or device housing, or a combination thereof.

\* \* \* \* \*